United States Patent [19]

Miller et al.

[11] 4,019,978

[45] Apr. 26, 1977

[54] PROCESS FOR THE PRODUCTION OF ALUMINA

[75] Inventors: Arthur William Miller, Frodsham; William Atkinson, Penketh, both of England

[73] Assignee: Laporte Industries Limited, London, England

[22] Filed: Nov. 4, 1974

[21] Appl. No.: 520,999

Related U.S. Application Data

[62] Division of Ser. No. 284,540, Aug. 29, 1972, Pat. No. 3,864,461.

[52] U.S. Cl. .............................. 208/213; 252/465; 252/463; 252/466 J; 252/437
[51] Int. Cl.$^2$ .................. C10G 23/02; B01J 23/76; B01J 23/48; B01J 21/04
[58] Field of Search ............... 252/466 J, 465, 437, 252/463; 208/213, 216, 217

[56] References Cited

UNITED STATES PATENTS

| 2,943,065 | 6/1960 | Braithwaite | 252/465 X |
|---|---|---|---|
| 2,980,632 | 4/1961 | Malley et al. | 252/466 J X |
| 2,984,630 | 5/1961 | Braithwaite | 252/465 X |
| 2,988,520 | 6/1961 | Braithwaite | 252/463 X |
| 3,287,280 | 11/1966 | Colgan et al. | 252/437 X |
| 3,630,670 | 12/1971 | Bell et al. | 252/463 X |
| 3,840,473 | 10/1974 | Beuther et al. | 252/465 X |
| 3,846,286 | 11/1974 | Phillipson | 252/466 J X |

*Primary Examiner*—Patrick P. Garvin
*Assistant Examiner*—William G. Wright
*Attorney, Agent, or Firm*—Beveridge, DeGrandi, Kline

[57] ABSTRACT

Low bulk density alumina consisting essentially of pseudoboehmite can be produced by forming aqueous solutions of sodium aluminate and aluminium sulphate having concentrations within defined ranges, controlling the rate of introduction of the sodium aluminate solution into a body of the aluminium sulphate solution and agitation of the mixture such that a substantial proportion of hydrous alumina precipitates under acidic conditions, controlling the temperature of the mixture, and controlling the length of time of alkaline ageing. The hydrous alumina is then filtered, preferably water washed, and then dried. The low bulk density alumina is useful as a catalyst base, particularly for hydrodesulphurization catalysts.

10 Claims, No Drawings

PROCESS FOR THE PRODUCTION OF ALUMINA

This is a division, of application Ser. No. 284,540, filed Aug. 29, 1972, now U.S. Pat. No. 3,864,461, which is relied upon and the entire disclosure and specification of which is hereby incorporated by reference.

The present invention relates to the production of hydrous alumina, and to catalysts produced therefrom.

Hydrous alumina having a relatively high bulk density can be produced by reaction between sodium aluminate and aluminium sulphate, and such a hydrous alumina may contain a substantial proportion of bayerite.

We have found that catalysts having improved hydrodesulphurisation properties can be prepared from hydrous alumina having a lower bulk density.

Accordingly it is an object of the present invention to provide a hydrous alumina having a relatively low bulk density. It is a second object to provide a hydrous alumina consisting essentially of pseudoboehmite. It is a third object to provide low bulk density alumina-based catalysts having improved hydrodesulphurisation properties. Other and further objects may become apparent to those skilled in the art upon reading the following description of the invention.

According to the present invention there is provided a process for the production of hydrous alumina comprising the steps of:

forming an aqueous solution of aluminium sulphate having a concentration of at least 2% by weight calculated as $Al_2O_3$, forming an aqueous solution of sodium aluminate, forming a mixture of the solutions, to precipitate hydrous alumina in the form of a slurry having a concentration of from 2% to 7% by weight by introducing the sodium aluminate solution into a body of the aluminium sulphate solution until the mixture reaches a composition of from 10% excess aluminium sulphate to 10% excess sodium aluminate, at such a rate and with sufficient agitation that a substantial proportion of the hydrous alumina precipitates under acidic conditions, whilst maintaining the mixture at a temperature within a range selected from one of the ranges 12° to 35° and 45° to 70° C., separating the hydrous alumina from its mother liquor and washing the separated hydrous alumina. The separated hydrous alumina may be dried before or after washing. According to another aspect of the invention there is provided a process for the production of hydrous alumina comprising the steps of:

forming an aqueous solution of aluminium sulphate having a concentration of at least 2% by weight calculated as $Al_2O_3$, forming an aqueous solution of sodium aluminate, forming a mixture of the solutions to precipitate hydrous alumina in the form of a slurry having a concentration of from 2% to 7% by weight, by introducing the sodium aluminate solution into a body of the aluminium sulphate solution, with agitation, progressively over a period of from about 1 minute to 5 hours until the mixture has a pH of from 7.3 to 10.0, at least half of the hydrous alumina precipitating under acidic conditions, whilst maintaining the mixture at a temperature within a range selected from one of the ranges 12° to 35° and 45° to 70° C, separating the hydrous alumina from its mother liquor and washing the separated hydrous alumina. By "excess" of a reagent, e.g. aluminium sulphate is meant excess of that reagent above a stoichiometric amount.

In order to control the concentration of the hydrous alumina slurry formed the aluminium sulphate and the sodium aluminate reactants should be used in concentrations and proportions determined by the following equation.

If A = % by weight $Na_2O$ in the sodium aluminate solution

B = % by weight $Al_2O_3$ in the sodium aluminate solution

C = % by weight of excess sodium aluminate

D = % by weight of $SO_3$ in the aluminium sulphate solution

E = % by weight of $Al_2O_3$ in the aluminium sulphate solution

Then % by weight of $Al_2O_3$ in the slurry $$= \frac{100E + (100 + c)\left(\frac{0.775 \times D \times B}{A}\right)}{100 + (100 + c)\left(\frac{0.775 \times D}{A}\right)}$$

If aluminium sulphate is in excess then C has a negative value.

The low bulk density hydrous alumina produced by a process according to the present invention consists mainly of pseudoboehmite, but may contain a small proportion of bayerite.

By "pseudoboehmite" we mean a hydrous alumina identical to the first product identifiable by X-ray diffraction obtained when freshly precipitated hydrous alumina is allowed to remain in contact with its mother liquor and having X-ray bands identical to those shown by crystalline boehmite except for the 6.11 Angstrom line. The terms "boehmite" and "bayerite" are used herein as defined in the A.S.T.M. X-ray Diffraction Index.

According to a further aspect of the present invention there is provided a low bulk density pseudoboehmite containing not more than 10% by weight of bayerite and preferably none, or, at most, only a trace of bayerite, that is to say not more than 5% by weight, of bayerite. Such a pseudoboehmite may have a powder bulk density of less than 0.55 gm/cc.

According to some aspects of the present invention there are provided catalyst precursors consisting essentially of compounds of at least one metal selected from Groups Ib, VIa and VIII dispersed upon an alumina carrier consisting essentially of pseudoboehmite. According to other aspects of the present invention there are provided catalyst precursors consisting essentially of compounds of at least one metal selected from Groups Ib, VIa and VIII dispersed upon a phosphate treated alumina carrier consisting essentially of pseudoboehmite containing from 0.1% to 12% by weight based on the catalyst of phosphate ions calculated as $P_2O_5$.

When an aqueous solution of sodium aluminate is introduced into an aqueous solution of aluminium sulphate, it is believed that basic aluminium sulphate is formed initially and that this then reacts with further sodium aluminate to precipitate hydrous alumina, forming a slurry containing dissolved sodium sulphate.

Initially the aluminium sulphate solution is acidic, and introduction of sodium aluminate solution causes the resultant mixture to have a higher pH, and if about 70% of the stoichiometric quantity or more of the sodium aluminate is introduced a pH of 7 or higher.

If the rate of introduction of the sodium aluminate solution, and the agitation are sufficiently controlled, a substantial proportion such as 50% or more of hydrous alumina precipitates before the mixture reaches a pH of 7.

Preferably the introduction is performed so as to maintain acidic conditions for ⅔ least ⅓ of the addition time.

The rate of introduction of the sodium aluminate solution in conjunction with the degree of agitation should be controlled so as to avoid extremes which could result in products having undesirable characteristics. By introducing "progressively" is meant introducing so as to avoid such extremes.

If the rate of introduction is too fast for the agitation local volumes may develop in the mixture in which the pH rises above 7. Hydrous alumina precipitated from such volumes may have undesirably high bulk densities.

It is to be understood that the introduction of the aqueous sodium aluminate solution need not be at a constant rate. Some variation in the rate of introduction may be tolerated, such as the variation resulting from the use of a gravity feed system. Alternatively the sodium aluminate may be introduced in portions, provided that each portion is a sufficiently small proportion of the total amount introduced, or each portion is itself introduced at a suitable rate and with sufficient agitation. In practice rates of introduction and degrees of agitation used depend also upon such features as design and size of apparatus used and quantities of reactants employed, but generally speaking, the faster or less constant the rate of introduction, the more efficient the agitation required to minimise occurences of extreme conditions. Suitably the agitation may be carried out mechanically. In small scale preparations each employing solutions of a few hundred milliliters the introduction may take as little as about 1 minute, whereas for large scale work periods of 15 hours or longer may be tolerable. solution of sodium aluminate is introduced into the aqueous solution of aluminium sulphate over a period of at least 15 minutes, but of not more than 1 hour particularly from about 30 minutes upwards for example from 30 minutes to 45 minutes in total.

In one method of performing the invention the body of aluminium sulphate solution may flow through a series of reactors and a proportional amount of the desired total quantity of sodium aluminate solution continuously introduced into it in each reactor, the total time of addition of the solution of sodium aluminate being determined by the hold-up time in each reactor and the rate of flow through the reactors.

The temperature at which the reaction mixture is maintained has an important effect on the nature of the hydrous alumina produced. At constant temperatures between about 35° and 45° C the product may comprise a major proportion of bayerite and so this temperature range is excluded from this invention. It is particularly preferred to maintain a temperature of from 55° to 70° C since within the whole range of about 35° to 55° C traces of bayerite still tend to form. The powder bulk density of pseudoboehmite manufactured according to this invention tends to be lowest when using temperatures within the preferred range and particularly when using temperatures from about 60° to 70° C for example temperatures of 65° or 66° C.

Preferably the sodium aluminate solution has a concentration of not more than 10% for example from 2% to 7.5% w/w calculated as $Al_2O_3$. Preferably the aluminium sulphate solution has a concentration of not more than 7.5% particularly not more than 6% by weight calculated as $Al_2O_3$. In a particularly advantageous embodiment of the invention the aluminium sulphate solution has a concentration of 5% w/w and the sodium aluminate solution has a concentration of 2.5% w/w both calculated as $Al_2O_3$. In a preferred embodiment of the invention these solutions may be used, and the sodium aluminate introduced continuously over 30 minutes at a substantially constant rate, hydrous alumina precipitating under acidic conditions for about 20 minutes.

The composition of the mixture may be controlled by using predetermined amounts of reagents having selected concentrations, or by ending the introduction when the mixture has a predetermined pH. In practice it is preferred to control the composition by cutting off the flow of sodium aluminate when the mixture has a pH of from 7.3 to 10.0, particularly 7.5 to 9.0. It has been found that at least a small level of substantially insoluble residual sulphate always remains in the hydrous alumina due to incomplete reaction. Use of a pH method of control enables satisfactory control of the level of residual sulphate in the hydrous alumina, which is important, because different applications of the hydrous alumina have different preferred levels within the range 0.5% to 5.0% by weight calculated as $SO_3$, values within this range being obtained by cutting off the flow of sodium aluminate solution when the mixture has a pH from 7.3 to 10.0.

The residual sulphate influences the powder density and pore volume of the hydrous alumina and the steam stability and initial activity of catalysts prepared from the hydrous alumina by dispersing metal oxides thereon, followed by calcination. The higher the sulphate content the lower is the powder density and the higher is the pore volume of the hydrous alumina and the lower is the initial activity and the better is the steam stability of catalysts prepared therefrom.

In one application the hydrous alumina is used as a carrier for dispersed metal oxides, thereby, after calcination, forming a hydrodesulphurisation catalyst. The preferred residual sulphate level of catalysts for hydrodesulphurisation of light and middle distillate oils is 1.5% to 2.2% calculated as $SO_3$ but for heavy distillates and residuals higher sulphate levels may be desirable.

After complete introduction of the desired amount of sodium aluminate, the mixture is alkaline. It may not always be practicable to filter the slurry immediately after formation. Alkaline ageing tends to cause a rise in the powder bulk density of the product and excessive alkaline ageing may cause a change in the structure of the hydrous alumina produced, as determined by X-ray diffraction measurements. The effect of ageing tends to be greater at higher temperatures. The slurry should not be aged for more than 3 hours and preferably is aged for not more than 2 hours. Particularly suitably the slurry is aged for not more than 45 minutes. The introduction of the sodium aluminate solution, and the ageing of the hydrous alumina should be so controlled that the hydrous alumina should be in alkaline conditions for not more than about 3 hours.

The pseudoboehmite content of the filtercake produced, calculated as $Al_2O_3$ by weight has an appreciable effect on the bulk density of the product. Preferably the filtration is conducted so as to give a filtercake having a hydrous alumina content of from 8% to 16% calculated as $Al_2O_3$.

Preferably the filtercake is water washed. Soluble sodium salts dissolve in the water, thereby lowering the soda content of the hydrous alumina. The washing may be controlled so as to completely remove the soluble sulphate thereby leaving only the predetermined level of residual sulphate, which as mentioned before is water-insoluble. Alternatively the hydrous alumina filtercake may be reslurried with water and refiltered to an alumina concentration of from 8% to 16% by weight calculated as $Al_2O_3$.

In a particular embodiment of the present invention there is provided a process for the production of hydrous alumina comprising the steps of:

forming an aqueous solution of sodium aluminate having a concentration of from 2% to 7% by weight calculated as $Al_2O_3$, forming an aqueous solution of aluminium sulphate having a concentration of from 2% to 7.5% by weight calculated as $Al_2O_3$, forming a mixture of the solutions wherefrom alumina precipitates forming a slurry by introducing the sodium aluminate solution progressively with agitation over a period of from 15 minutes to 1 hour, until the mixture has a pH of from 7.3 to 10.0 maintaining acidic conditions during at least ⅔ of said period, maintaining the mixture and slurry at a temperature within a range selected from one of the ranges 12° to 35° C and 45° to 70° C, ageing the slurry for not more than 2 hours, forming a filtercake by filtering the slurry, to a concentration of hydrous alumina calculated as $Al_2O_3$ of from 8% to 16% by weight, washing the filtercake with at least its own volume of water and drying the filtercake at a temperature not exceeding 150° C.

In some embodiments of the invention the precipitated hydrous alumina may be treated with a phosphate-containing solution. Preferably the hydrous alumina to be so treated is in the form of a filtercake, particularly a water washed filtercake, the filtercake suitably having an alumina content of from 8% to 16% by weight calculated as $Al_2O_3$, which is slurried with water and with the phosphate-containing solution. One suitable method of phosphate-treating the alumina is described in U.S. Pat. No. 2,441,297, Example 3, wherein the alumina is treated with aluminium nitrate and then with monohydrogen ammonium orthophosphate. Other suitable methods of treatment are described in South African Pat. No. 70/6810 in which the phosphate-containing solutions described are solutions of phosphoric acid, alkali or alkaline earth phosphates, acid phosphates e.g. $NaH_2PO_4$ or $Na_2HPO_4$ or ammonium phosphate. Treatments with alkali or alkaline earth phosphates are less preferred because their use introduces extra metal ions into the product. Preferably the alumina contains from about 1% to about 10% particularly from 1% to 5%, percentages being by weight based on the calcined product, of phosphate calculated as $P_2O_5$.

When it is desired to use the hydrous alumina product according to this invention in drying gaseous or organic solvents or as a dehydration catalyst, it is calcined preferably after drying. If calcination is carried out at a temperature below about 400° C the pseudoboehmite structure is retained although, if desired, a gamma type of alumina may be produced by calcining at higher temperatures. Preferably the calcination is conducted at a temperature of from 300° to 400° C.

The hydrous alumina of this invention is a particularly suitable catalyst carrier and is an especially suitable carrier for a metal compound or metal compounds of a metal or metals selected from Groups I$b$, VI$a$ and VIII (the Groups being as described in "Inorganic Chemistry" by "Cotton & Wilkinson".) Such catalysts may be produced by first forming a catalyst precursor by introducing said metal compound or compounds onto the hydrous alumina, and drying if desired, and secondly forming the catalyst by calcining. Certain of such catalysts are hydrodesulphurisation catalysts. In the production of hydrodesulphurisation catalysts said metal compound or compounds are oxides, or oxide-producing compounds selected from cobalt and nickel from Group VIII and molybdenum from Group VI$a$. Preferably compounds of at least two metals, e.g. cobalt and molybdenum are introduced onto the hydrous alumina. Methods of introducing such oxide-producing compounds of cobalt and molybdenum are described herein. It is to be understood that references to introducing such cobalt and molybdenum compounds apply mutatis mutandis to introducing equivalent compounds of the other Groups VI$a$ and VIII metals. The cobalt and molybdenum compounds may be added to the dried hydrous alumina after production according to this invention. Preferably since, suitably at least 50% of the cobalt and molybdenum compounds are added to the washed filtercake produced according to this invention before drying. Preferably the filtercake has been treated previously with a phosphate-containing solution. In especially preferred embodiments substantially all of the cobalt and molybdenum compounds are added to the washed wet filtercake.

The cobalt compound is advantageously cobalt formate. It may be introduced onto the hydrous alumina in the form of a solid, for example in an aqueous slurry. The molybdenum compound is advantageously molybdic acid or ammonium para-molybdate or technical molybdic oxide. It may also be added to the hydrous alumina as a solid, for example, in an aqueous slurry, or as a suitable aqueous solution. After blending, the hydrous alumina based catalyst precursor is either dried and calcined or, less preferably where the cobalt and molybdenum compounds have been added after drying, merely calcined. The calcination temperature necessary to produce activated catalyst is generally above about 450° C and at such temperatures the pseudoboehmite will change its structure and lose most of its water to form a gamma alumina. At such temperatures the oxide-containing compounds are believed to break down to form the corresponding oxides. Preferably the calcination is conducted at a temperature between 450° and 650° C.

The hydrous alumina produced according to the present invention, or catalyst precursors produced therefrom may be formed into tablets or extrudates by known means. For example, where tablets are desired a known lubricant such as aluminium stearate may be added to the hydrous alumina, or catalyst precursors, the tablets are formed in suitable dies and the tablets are calcined as above described. Where extrudates are desired, either, preferably, non-dried or partially dried filtercake or non-dried or partially dried catalyst precursor is extruded, or less preferably, some water may be added to dried filtercake or dried catalyst precursor, and the extrudates are the dried if desired, and then calcinated as above described. The bulk density of the calcined extrudates may be controlled to some exten by controlling the temperature and water content during extrusion.

The low powder bulk density pseudoboehmite produced according to present invention is particularly suitable for, or in production of, Group VIa metal oxide/Group VIII metal oxide hydrodesulphurisation catalysts. The wet pseudoboehmite filtercake accepts the oxide-containing compounds readily. Bayerite accepts the oxide-containing compounds onto the filter cake less readily. Low bulk density hydrous aluminas and catalysts such as those produced according to this invention tend to have a large surface area per unit weight. They tend to give a greater activity per unit weight either of hydrous alumina or of catalytic metal oxide, then respectively aluminas of higher bulk density or catalysts based thereon. Catalysts using as a support hydrous alumina manufactured according to this invention have a comparatively large pore volume. For this reason the hydrodesulphurisation catalysts of this invention are of particular advantage in use in treatment of heavy feedstocks.

Certain embodiments of the present invention will now be described more fully by way of example only.

EXAMPLES 1–11

Aqueous sodium aluminate solution (2.5% $Al_2O_3$ w/w) was run, at a substantially constant rate with stirring, into a beaker of aqueous aluminium sulphate solution (5.0% $Al_2O_3$ w/w) over a period of 30 minutes to give a mixture having a composition containing 5% excess sodium aluminate. A neutral pH was reached after 20 minutes and remained below 10 throughout. The temperature was maintained as indicated in Table 1. The resulting slurry was aged for 30 minutes at the reaction temperature and filtered to the indicate $Al_2O_3$ content and the filtercake was washed with 3 × 1 liters of water, at room temperature. The washed cake was dried at 100° C, ground and sieved to less than 100 mesh. In each example the powder bulk density of the hydrous alumina was measured as follows. Two weighed graduated centrifuge tubes of 15 ml. capacity were filled up to the 10 ml. marks with the sample without tapping but avoiding airlocks. The tubes were placed in a laboratory centrifuge and were brought up to full rotation speed over a period of 1 minute and were held at full speed for a further 1 minute and were slowed down to a stop over a further 1 minute. The volume of each tube occupied was noted and the sample was weighed.

$$\text{The bulk density of the sample} = \frac{\text{weight of sample}}{\text{volume occupied}} \text{ g/ml.}$$

When we use the term "powder bulk density" herein we mean that it has been, or is to be, measured as above described.

Examples 2, 3, and 6 through 11 are according to the present invention and Examples 1, 4 and 5 are inserted for purposes of comparison only.

TABLE I

| Ex. | Reaction Temp. °C | $Al_2O_3$ in filter cake % w/w | Filtration time min. | Washing time min. | Powder Bulk Density |
|---|---|---|---|---|---|
| 1 | 9 | 11.3 | 10 | 26 | 0.56 |
| 2 | 20 | 11.8 | 7 | 44 | 0.46 |
| 3 | 30 | 11.8 | 4 | 17 | 0.45 |
| 4 | 39 | 11.6 | 6 | 12 | 0.62 |
| 5 | 43 | 11.9 | 5 | 20 | 0.49 |
| 6 | 48 | 11.8 | 4 | 16 | 0.53 |
| 7 | 53 | 11.9 | 5 | 20 | 0.42 |
| 8 | 57 | 11.9 | 4 | — | 0.41 |
| 9 | 65 | 11.4 | 2 | 17 | 0.36 |
| 10 | 66 | 10.7 | 2 | 14 | 0.31 |
| 11 | 72 | 11.0 | 2 | 13 | 0.42 |

| Ex. | Loss on ignition % w/w | % $SO_3$ dried weight basis | X-ray Identification |
|---|---|---|---|
| 1 | 23.95 | 1.24 | Pseudo-Boehmite |
| 2 | 24.48 | 2.17 | |
| 3 | 23.64 | 1.37 | Pseudo-Boehmite |
| 4 | 24.86 | <1.0% | Bayerite & Pseudo-Boehmite |
| 5 | 22.08 | <1.0% | Pseudo-Boehmite and <5.0% Bayerite |
| 6 | 22.34 | <1.0% | Pseudo-Boehmite |
| 7 | 21.45 | <1.0% | Pseudo-Boehmite <5.0% Bayerite |
| 8 | 21.24 | <1.0% | Pseudo-Boehmite |
| 9 | 21.67 | <1.0% | Pseudo-Boehmite |
| 10 | 22.14 | <1.0% | Pseudo-Boehmite |
| 11 | 21.88 | <1.0% | Pseudo-Boehmite and <5.0% Bayerite |

EXAMPLES 12–29

The procedure of Examples 1–11 was followed except that the concentrations of the aqueous solutions of aluminium sulphate and sodium aluminate were varied as shown in Table II, and also, in some experiments, the method of addition was varied — aluminium sulphate solution being introduced, where indicated, into a bulk of the sodium aluminate solution. The reaction temperature was 20° ± 3° C.

TABLE II

| Sodium aluminate conc. as ($Al_2O_3$) | Aluminium sulphate conc. (as $Al_2O_3$) | | | | | | |
|---|---|---|---|---|---|---|---|
| | Sodium aluminate added to aluminium sulphate | | | Aluminium sulphate added to sodium aluminate | | | |
| | 1.0 | 2.5 | 5.0 | 1.0 | 2.5 | 5.0 | |
| 12.5 | 12 | 13 | 14 | 21 | 22 | 23 | Ex |
| | 0.84 | 0.38 | 0.73 | 1.02 | 0.74 | 0.79 | BD |
| | 2.8 | 5.7 | 8.4 | 2.8 | 5.7 | 8.4 | C |
| 7.5 | 15 | 16 | 17 | 24 | 25 | 26 | Ex |
| | 0.84 | 0.30 | 0.41 | 0.66 | 0.66 | 0.64 | BD |
| | 2.6 | 4.7 | 6.4 | 2.6 | 4.7 | 6.4 | C |
| 2.5 | 18 | 19 | 20 | 27 | 28 | 29 | Ex |
| | 0.82 | 0.42 | 0.31 | 0.99 | 1.00 | 0.86 | BD |
| | 1.7 | 2.4 | 2.8 | 1.7 | 2.4 | 2.8 | C |

In Table II Ex represents the number of the example, BD represents powder bulk density, C represents alumina content of the slurry by weight calculated as $Al_2O_3$.

Example 12, 15, 18, 14 and 21 through 29 are inserted for purposes of comparison only. Examples 13, 16, 17, 19 and 20 are according to the present invention.

EXAMPLE 30

136 lbs of solid aluminium sulphate, (analysis 16.7% w/w $Al_2O_3$, 37.8% w/w $SO_3$), was dissolved in 32 gallons of water in the reactor to give a solution containing 5% by weight $Al_2O_3$. 191 lbs sodium aluminate (analysis 21.9% w/w $Na_2O$, 25.9% w/w $Al_2O_3$) was dissolved in 180 gallons of water to form a solution containing 2.5% by weight $Al_2O_3$. The sodium aluminate solution was introduced continuously over a period of 30 minutes at a substantially constant rate, the pH remaining at or below 7 for the first 20 minutes and remaining below 10.0 throughout. The mixture was mechanically stirred continuously at a temperature of 65° C. After a further period of 30 minutes stirring, the mixture was run onto flat filters and washed with distilled water. The filtercake was mixed in a Z blade mixer for 2 minutes, cobalt formate and ammonium para molybdate and water added. The mixture was blended for 15 minutes and the put onto trays and dried at approximately 90° C. After grinding, the powder was mixed with aluminium stearate lubricant and tableted in ⅛ inch dies.

The maximised bulk density of the calcined material was 0.3 g/ml. The powder bulk density of the dried material was 0.22 g/ml.

The term "maximised bulk density" meant bulk density measured as described below.

The bulk density was determined by machine tapping a weighed portion in a 250 ml. measuring cylinder B.S. 604. The machine was such that the cylinder was raised and then dropped a distance of 5/16 inch at a frequency of 6–7 taps per second, the raising and dropping action being achieved by means of a spiral cam whose radius increases uniformly by 5/16 inch over a complete revolution. In operation the machine was switched on and allowed to reach operating speed. By means of a 25 ml. beaker the sample was transferred to the cylinder at a rate of 25 ml. every 15 seconds until a transfer of 220–230° ml. was obtained. The machine was run for a further 15 seconds and then switched off. The surface was leveled with the aid of a rubber bung on a metal rod and the volume noted. The cylinder was removed from the machine and the contents weighed.

Maximised Bulk Density (g/ml) = W/V

Where W = weight of sample (g)

V = volume of sample (ml)

The material was tested in standard hydrodesulphurisation fixed volume equipment using light distillate naphtha of the following characteristics:

| Specific Gravity (SG) (60° F) | | 0.72 |
|---|---|---|
| Sulphur (ppm) 350–400 | | |
| Initial boiling point (IBP) | | 40° C |
| Final boiling point (FBP) | | 175° C |
| Typical hydrocarbons | | |
| Olefins | % v/v | 0.1 |
| Aromatics | % v/v | 7.1 |
| Paraffins | % v/v | 92.8 |

The sulphur removal was 99% at 675° F (HSV, 1.5, 200 p.s.i.g. using a hydrogen nitrogen mixture. At 575° F the sulphur removal was 98% (LHSV = Liquid hourly space velocity).

EXAMPLE 31

123.5 lbs of solid aluminium sulphate was dissolved in 30 gallons of water (4.9% by weight $Al_2O_3$) and a solution of 196.8 lbs of sodium aluminate and 184 gallons of water (2.5% by weight $Al_2O_3$) was added to it with stirring over 30 minutes at a substantially constant rate at 65° C. The pH remained below 10.0. The mixture was aged for 30 minutes and the reaction temperature and the reaction mixture was then dropped onto filters in 20 minutes and washed with water for 1½ hours. The $Al_2O_3$ content of the filtercake was 11.8% and after blending in the cobalt formate and ammonium para molybdate and drying, the dried material was ground and extruded through 3/32 inch holes and calcined. The powder bulk density of the dried material was 0.43 g/cc. This material gave a % desulphurisation of 76 (without pretreatment) using a middle distillate at 675° F, 200 p.s.i.g LHSV 2.0 and 178 volumes of pure hydrogen per volume of oil, volumes measured at STP.

EXAMPLES 32 AND 33

Catalyst A used in Example 32 was prepared by the process described in Example 31. In Example 33, inserted for purposes of comparison only, Catalyst B was a standard alumina-based hydrodesulphurisation catalyst prepared analogously by precipitating hydrous alumina containing a substantial proportion of bayerite from a reaction mixture of sodium aluminate and aluminium sulphate and thereafter following corresponding steps to the steps of the process described in Example 31. The properties of the catalysts are summarized in Table II.

TABLE II

| | A | B |
|---|---|---|
| CoO% w/w | 3.4 | 3.9 |
| $MoO_3$% w/w | 11.6 | 12.9 |
| Diameter inches | 0.086 | 0.097 |
| Maximised bulk density | 0.6 | 0.800 |

The properties of the oils are given below:

| Middle distillate gas oil | |
|---|---|
| S G (60° F) | 0.876 |
| Sulphur % | 2.06 |
| I BP | 268° C |
| 50% BP | 324° C |
| F BP | 393° C |
| Cloud point | 34° F |

| Heavy vacuum gas oil (mixed crude source) | |
|---|---|
| S G (100° F) | 0.882 |
| % S | 1.55 |
| % N | 0.13 |
| Pour point | 90° F |

| Vacuum distillation (approx.) | |
|---|---|
| I BP | 250° C |
| 50% BP | 450° C |
| F BP | 580° C |

| Middle distillate | % desulphurisation | |
|---|---|---|
| L H S V | Catalyst A | Catalyst B |
| 1 | 89.0 | 90.9 |
| 2 | 76.8 | 82.0 |
| 3 | 67.2 | 71.6 |
| 4 | 59.5 | 62.4 |

| Heavy vacuum | % desulphurisation | |
|---|---|---|
| L H S V | Catalyst A | Catalyst B |
| 1 | 93.9 | 93.9 |
| 2 | 85.2 | 85.2 |
| 3 | 78.8 | 75.6 |

-continued

| 4 | 67.0 | 62.6 |

EXAMPLES 34-36

A solution of sodium aluminate, 140 kg in 1280 liters of water, was added to a solution of aluminium sulphate, 180 kg in 180 liters of water, slowly but continuously over a period of 33 minutes, pH of 7 being reached 21 minutes. The temperature of the solutions was maintained throughout at from 67° to 68° C. On completion of the addition of sodium aluminate solution, the pH of the mixture was 8.8 after which time the mixture was stirred for a further 30 minutes. The batch was divided into two halves, and each half was filtered and washed with 4 portions each of 805 liters of water. The two halves were recombined and three parts, each equal to 1/5 of the batch were withdrawn from the batch. Each part was then washed with a further 200 liters of water and was mixed for about 30 minutes with 100% phosphoric acid, slurried for about 15 minutes with a slurry of cobalt formate and then mixed for about 30 minutes with a solution of ammonium molybdate, all mixing or slurrying operations taking place in a ball mill. The amounts of 100% phosphoric acid, cobalt formate and ammonium molybdate used to treat each part are shown in Table I. The percentage of cobalt compound, calculated as $CoO_3$, and based on the calcined alumina carrier, present in each part after this first stage treatment, are also shown in Table III.

TABLE III

| Catalyst | | C | D | E |
|---|---|---|---|---|
| $H_3PO_4$ Kg | | 0.410 | 0.623 | 0 |
| | | 0.588 | 0.595 | 0.575 |
| Cobalt hydrate | Kg | 0.647 | 0.655 | 0.630 |
| Formic acid | Kg | 1.47 | 1.487 | 1.435 |
| water | Kg | | | |
| Ammonium molybdate liquor | Kg | 6.25 | 6.35 | 5.6 |
| Cobalt (% CoO) | | 3.27 | 3.20 | 3.60 |
| Molybdenum (% $MoO_3$) | | 10.50 | 11.30 | 11.95 |

The parts were filtered, and dried for 48 hours at a temperature of from 80° to 90° C. The dry alumina, resulting from the first stage of treatment was ground, and, a 4.15 kg portion of each part was treated with a cobalt formate and ammonium molybdate using similar methods of treatment employed in the first stage. The quantities of cobalt formate, and ammonium molybdate used are shown in Table IV.

TABLE IV

| Catalyst | C | D | E |
|---|---|---|---|
| Cobalt hydrate | 22.4 g | 23.9 g | 5.5 g |
| Formic acid | 25 ml | 27 ml | 6.1 ml |
| Water | 60 ml | 60 ml | 14 ml |
| Ammonium molybdate liquor | 270 ml | 175 ml | 90 ml |

Each portion was then filtered, extruded into pellets of nominally 1/16 inch diameter, dried for 15 hours at a temperature of from 80° to 90° C and then calcined at a temperature of 550° C for 2 hours. The resulting catalyst was then tested for catalytic activity on a standard hydrodesulphurisation test rig employing as hydrocarbon fraction a diesel oil feed having the inspection data shown in Table V. The results obtained are shown in Table VI.

TABLE V

| % Sulphur | 1.78 |
| Initial B.P. | 218° C |
| A.S.T.M. 50% point | 302° C |
| Final B.P. | 358° C |
| Specific Gravity | .862 |

TABLE VI

| Catalyst | C | D | E |
|---|---|---|---|
| Phosphate % | 1.1 | 1.9 | 0 |
| Cobalt oxide % | 3.70 | 3.70 | 3.60 |
| Molybdenum oxide % | 13.4 | 12.8 | 12.1 |
| Surface Area | 326 | 342 | 312 |
| Bulk Density | 0.53 | 0.54 | 0.55 |
| VRA | 141 | 167 | 119 |

In Tables III and V the ammonium molybdate liquor contained 25% by weight of molybdate calculated as $MoO_3$, based on the liquor.

In Table VI VRA is a measure of catalytic activity, high VRA number indicating good hydrodesulphurisation.

In Table VI the basis for each percentage is the weight of the calcined catalyst. The phosphate is calculated as $P_2O_5$, oxide of cobalt as $CoO$ and oxide of molybdenum as $MoO_3$.

We claim:
1. A process for the production of an alumina based catalyst comprising the steps of:
    a. forming an aqueous solution of aluminium sulphate having a concentration of at least 2% by weight calculated as $Al_2O_3$,
    b. forming an aqueous solution of sodium aluminate,
    c. forming a mixture of the solutions to precipitate hydrous alumina in the form of a slurry, having a concentration of from 2% to 7% by weight, by introducing the sodium aluminate solution, until the mixture reaches a composition of from 10% excess aluminum sulphate to 10% excess sodium aluminate and until the resulting solution has a pH in the range between 7.3 to 10, at such a rate and with sufficient agitation that a substantial proportion of the hydrous alumina precipitates under acidic conditions, whilst maintaining the mixture at a temperature within a range selected from the ranges 12° to 35° and 45° to 70° C,
    d. separating the hydrous alumina from its mother liquor and washing the separated hydrous alumina,
    e. impregnating the hydrous alumina from step (d) with at least one compound of at least one metal selected from Group Ib, VIa and VIII, and
    f. calcining the treated hydrous alumina at a temperature above 400° C.
2. A process as claimed in claim 1 wherein the hydrous alumina from step (e) is shaped before calcination.
3. A process as claimed in claim 1 having an additional step comprising treating the hydrous alumina precipitate before step (e), with a solution containing phosphate ions.

4. A process as claimed in claim 1 wherein in step (e) the said treatment is with at least one oxide-producing compound of molybdenum and at least one oxide-producing compound selected from compounds of cobalt and nickel, and the calcination temperature in step (f) is from 450° to 650° C.

5. A process as claimed in claim 4 wherein in step (e) the said treatment is with a solution containing the said oxide-production compounds.

6. A process for the production of an alumina based catalyst comprising the steps of:
   a. forming an aqueous solution of sodium aluminate having a concentration of from 2% to 7% by weight calculated as $Al_2O_3$,
   b. forming an aqueous solution of aluminium sulphate having a concentration of from $2\pi$ to 7.5% by weight calculated as $Al_2O_3$,
   c. forming a mixture of the solutions wherefrom hydrous alumina precipitates forming a slurry having a concentration of from 2% to 7% by weight, by introducing the sodium aluminate solution progressively with sufficient agitation over a period of from 15 minutes to 1 hour, until the mixture has a pH of from 7.3 to 10.0 maintaining acidic conditions during at least ⅔ of the period,
   d. maintaining the mixture and slurry at a temperature of from 55° to 70° C, and ageing the slurry for not more than 2 hours,
   e. separating the hydrous alumina from its mother liquor by filtration and forming a filtercake having a concentration of hydrous alumina calculated as $Al_2O_3$ of from 8% to 16% by weight and washing the filtercake with at least its own volume of water,
   f. impregnating the hydrous alumina from step (e) with at least one oxide-producing compound of molybdenum and at least one oxide-producing compound selected from compounds of cobalt and nickel,
   g. drying the treated hydrous alumina at a temperature not exceeding 150° C and calcining at a temperature of from 450° to 650° C.

7. A process as claimed in claim 6 having the additional step comprising treating the hydrous alumina precipitate, before step (f), with a solution containing phosphate ions.

8. A process for hydrodesulphurization comprising contacting a feedstock containing sulphur with an alumina-based catalyst prepared by a process comprising the steps of:
   a. forming an aqueous solution of aluminium sulphate having a concentration of at least 2% by weight calculated as $Al_2O_3$,
   b. forming an aqueous solution of sodium aluminate,
   c. forming a mixture of the solutions to precipitate hydrous alumina in the form of a slurry, having a concentration of from 2% to 7% by weight, by introducing the sodium aluminate solution, until the mixture reaches a composition of from 10% excess aluminium sulphate to 10% excess sodium aluminate and until the resulting solution has a pH in the range between 7.3 to 10, at such a rate and with sufficient agitation that a substantial proportion of the hydrous alumina precipitates under acidic conditions, whilst maintaining the mixture at a temperature within a range selected from the ranges 12° to 35° and 45° to 70° C.
   d. separating the hydrous alumina from its mother liquor and washing the separated hydrous alumina,
   e. impregnating the hydrous alumina from step (d) with at least one oxide-producing compound of molybdenum and at least one oxide-producing compound selected from compounds of cobalt and nickel,
   f. calcining the treated hydrous alumina at a temperature above 400° C.

9. A process for hydrodesulphurization as claimed in claim 8 having the additional step comprising treating the hydrous alumina precipitate, before step (e) with a solution containing phosphate ions.

10. A process for the production of an alumina based catalyst comprising the steps of:
   a. forming an aqueous solution of aluminum sulphate having a concentration of at least 2% by weight calculated as $Al_2O_3$.
   b. forming an aqueous solution of sodium aluminate having a concentration of from 2% to 7% by weight calculated as $Al_2O_3$.
   c. forming a mixture of the solutions formed in stages (a) and (b) to precipitate hydrous alumina in the form of a slurry having a concentration of from 2% to 7% by weight, by introducing the sodium aluminate solution into the aluminum sulfate solution until the mixture reaches a composition of from 10% excess aluminum sulphate to 10% excess sodium aluminate and wherein the addition takes place with sufficient agitation over a period of about 1 minute to 5 hours until the mixture has a pH of from 7.3 to 10.0 to precipitate at least half of the hydrous alumina under acidic conditions while maintaining the mixture at a temperature in the range 12° to 35° C or in the range of 45° to 75° C.
   d. separating the hydrous alumina from its mother liquor and washing the separated hydrous alumina.
   e. impregnating the hydrous alumina from step (d) with at least one compound of at least one metal selected from Group Ib, VIa and VIII, and
   f. calcining the treated hydrous alumina at a temperature above 400° C.

* * * * *